Oct. 5, 1971      E. O. SEABOURN      3,609,826

FASTENING MEANS

Filed Oct. 22, 1969

INVENTOR.
E.O. SEABOURN

BY *Young & Quigg*

ATTORNEYS

United States Patent Office 3,609,826
Patented Oct. 5, 1971

3,609,826
FASTENING MEANS
Ed O. Seabourn, Stavanger, Norway, assignor to
Phillips Petroleum Company
Filed Oct. 22, 1969, Ser. No. 868,421
Int. Cl. B65d 63/06
U.S. Cl. 24—279
8 Claims

ABSTRACT OF THE DISCLOSURE

A fastening means having a fastener and holding elements for rapid installation and removal.

---

Figure 1:
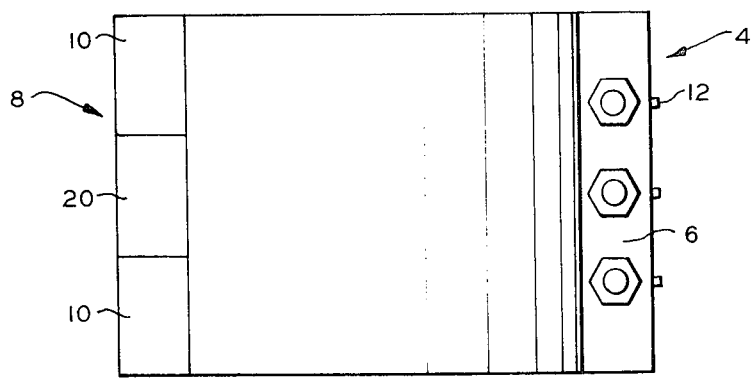

This invention relates to an improved fastening apparatus. In another aspect this invention relates to a clamping apparatus that provides more rapid attachment and release of flanges of the clamping elements.

Fastening apparatus heretofore used for maintaining a plurality of plates in a fixed position comprised a plurality of bolts through the flanges to urge the flanges toward one another and maintain one flange relative to the other. These bolts functioned properly but required a large expenditure of labor and time to correctly install and remove. Clamps frequently utilized this type fastening apparatus. Later, clamps were developed that had one side of each clamping element hingedly connected to the other. The time and labor required to install or remove these improved clamps were decreased but it was still necessary to completely remove the nuts and bolts from one side of the clamp. In operations such as oil well drilling where a multitude of clamps are utilized, the removal and installation of clamps represent large expenditures of labor, manpower, and particularly large amounts of time during which the vast amount of drilling equipment cannot be utilized until the work on the clamps has been completed. In other operations, the space surrounding the fasteners can be small, resulting in increased difficulty and time required for removal or installation of the bolts and nuts of the flanges.

It is therefore an object of this invention to provide an improved fastening means. Another object of this invention is to provide a fastener that can be more easily and quickly installed and removed. Further aspects, objects, and advantages of the present invention will become apparent from a study of the disclosure, the appended claims and the drawing.

Figure 2:
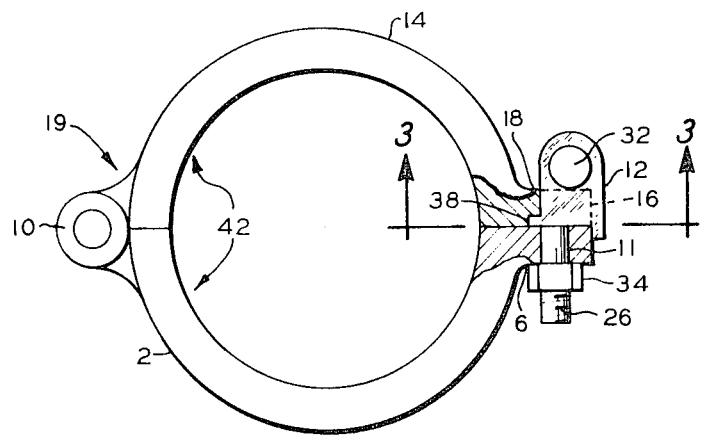
Figure 3:
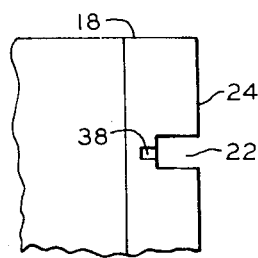
Figure 4:
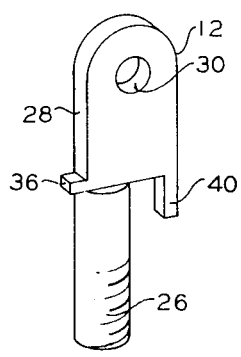

In the drawings, FIG. 1 is a diagrammatic side view of the fastening means of this invention, FIG. 2 is a diagrammatic plan view of FIG. 1, FIG. 3 is a partial view taken along lines III—III of FIG. 2, and FIG. 4 is a diagrammatic plan view of the fastener of this invention.

FIG. 1 shows a second element 2. The second element 2 has a first side 4 with a laterally extending flange 6 and an opposed second side 8 with, for example, a hinge 10 formed thereon. The flange 6 of the second element 2 has at least one and preferably a plurality of holes 11 formed therethrough with fasteners 12 extending through said holes.

FIG. 2 shows the first element 14. The first element has a first side 16 with a laterally extending flange 18 and an opposed hinge 20 formed thereon. The hinge 20 of the first element 14 is pivotally connected to the hinge 10 of the second element 2 for movement of the first and second elements 14, 2 about their respective second sides 19, 8 between a first position shown at which the flanges 6, 18 are adjacent and a second position at which said flanges 6, 18 are spaced one from the other.

Referring to FIG. 3, the flange 18 of the first element 14 has at least one and preferably a plurality of slots 22 formed therethrough with each slot extending from an outer edge 24 of the flange 18 a distance toward the second side 19 with each slot 22 being in register with a hole 11 formed through the second element 2 when the elements are in their first positions.

Referring to FIG. 4, an elongated fastener 12 has a threaded first end portion 26 and a second end portion 28 with a hole 30 formed therethrough perpendicular to the longitudinal axis of said fastener 12. In the first position of the elements 2, 14, better seen in FIG. 2, the first end portion 26 of the fastener 12 extends through the hole 11 of the second element 2 and the second end 28 of the fastener 12 extends through the slot 22 of the first element 14. A holding element 32, preferably a bar, extends through the hole 30 of the fastener 12 and is in contact with the flange 18 of the first element 14. Holding means, such as a nut 34, is mounted on the first end 26 of the fastener 12 and is in contact with the flange 6 of the second element 2.

In order to stabilize the fasteners 12 where there are a plurality of fasteners 12 utilized, the bar is of sufficient length to extend through the hole 30 of each fastener 12. It is recommended that a plurality of fasteners 12 be utilized where there are large forces exerted on the apparatus or where the apparatus is of relatively long lengths. Also where the apparatus or clamps are to be subjected to dynamic forces it is recommended that the fastener 12 have a lateral protrusion 36 extending between the flanges 6, 18 of the first and second elements 14, 2 and into a groove 38 formed on the flange 18 of the first element 14 and a longitudinal protrusion 40 extending from the second end portion 28 of the fastener 12 across a portion of the flange 6 of the second element 2 as the elements 2, 14 and the fasteners 12 are in a fastening position. These protrusions 36, 40 of the fasteners 12 stabilize the fasteners relative to the elements 2, 14 during tightening of the fasteners 12 and assure proper make-up of the nut 34 on the first end 26 of the fastener 12. For clamping and maintaining articles having certain configuration and thickness it is preferred that a middle portion 42 of each element 2, 14 between the respective first and second sides be spaced a distance one from the other in the second position of the elements 2, 14 for receiving the articles to be maintained.

In the original attachment of the apparatus of this invention when used with a composite clamp having flanges, the first and second elements 2, 14 are placed around the article to be clamped and the first end portion 26 of the fastener 12 is inserted through the hole 11 of the flange 6 of the second clamping element 2. The bar 32 is inserted through the hole 30 of the fastener 12 and the nut 34 is made up to forcefully urge the flanges 6, 18 into contacting relationship. After the fasteners 12 have been originally installed, the clamp can be removed and reinstalled quickly by loosening the nut to free the bar 32 from forceful contact with the flange 18, removing the bar 32 and pivoting the elements 2, 14.

It has been found that with the construction of the fastening means of this invention the fastener can be removed by turning one nut approximately one turn and lifting the bar. Where a multitude of clamps are needed, a fastening means of this invention will save large amounts of time and labor during installation and removal. The fastening means can be used with clamps or any flange pair wherein rapid installation or removal is desired.

Other modifications and alterations of this invention will become apparent to those skilled in the art from the foregoing discussion and accompanying drawing, and it should be understood that this invention is not to be unduly limited thereto.

What is claimed is:

1. A fastening means, comprising:
   first and second elements to be fastened one to the other each having a first side with a laterally extending flange movable between a first position at which the flanges are adjacent and a second position at which the flanges are separated one from the other, said flange of the first element having a slot therethrough extending from an outer edge of the flange a distance toward an opposed second side with said slot being in register with a hole formed through the flange of the second element in the first position of the elements;
   an elongated fastener having a threaded first end and a second end with a hole therethrough, said first end of the fastener extending through the hole of the second element and said second end of the fastener extending through the slot of the first element in the first position of the elements;
   a holding element extending through the hole of the fastener and in contact with the flange of the first element; and
   means on the first end of the fastener in contact with the flange of the second element for urging the holding element against the flange of the first element and the flanges of the first and second elements into forceful contact one with the other.

2. A fastening means, as set forth in claim 1, wherein there are a plurality of fasteners mounted on the first and second elements and the holding element extends through the hole of each fastener.

3. A fastening means, as set forth in claim 1, wherein the fastener has a lateral protrusion extending between the flanges of the first and second elements and into a groove formed on the flange of the first element and a longitudinal protrusion extending from the second end portion of the fastener across a portion of the flange of the second element in the clamping position of the elements and the fastener.

4. A fastening means, as set forth in claim 1, wherein a portion of each element between the respective first and second sides is spaced a distance one from the other in the first position of the elements for clamping an article therebetween.

5. A fastening means, as set forth in claim 1, wherein the holding element is a bar.

6. A fastening means, as set forth in claim 1, wherein the second sides of the first and second elements are hingedly connected one to the other.

7. An apparatus for contacting a pair of flanges with an opening formed through each flange in register one with the other in the fastening position of the pair of flanges, comprising:
   an elongated fastener having a threaded first end and a second end with a hole formed therethrough, said first end of the fastener extending through the opening of the first flange and the second end of the fastener extending through the opening of the second flange in the fastening position of the flanges;
   a bar extending through the hole of the fastener and in contact with the flange of the first element; and
   means on the first end of the fastener in contact with the flange of the second element for urging the bar against the flange of the first element and the flanges of the first and second elements into forcible contact one with the other.

8. An apparatus, as set forth in claim 7, wherein there are a plurality of fasteners extending through a first and second flange, each fastener having a hole therethrough perpendicular to the longitudinal axis of the fastener and one bar extending through the holes of the plurality of fasteners.

References Cited

UNITED STATES PATENTS

| | | | |
|---|---|---|---|
| 172,669 | 1/1876 | Stevens | 138—99 |
| 492,047 | 2/1893 | Otis et al. | 138—99 |
| 863,461 | 8/1907 | Smithson | 24—249PRC |
| 3,114,188 | 12/1963 | Nourse | 24—249PRC |

FOREIGN PATENTS

| | | | |
|---|---|---|---|
| 116,863 | 6/1918 | Great Britain | 138—99 |

DONALD A. GRIFFIN, Primary Examiner